United States Patent [19]

Taghezout

[11] Patent Number: 5,736,806
[45] Date of Patent: Apr. 7, 1998

[54] CYLINDRICAL ELECTROCHEMICAL TRANSDUCER

[75] Inventor: Daho Taghezout, Lausanne, Switzerland

[73] Assignee: Eta SA Fabriques d'Ebauches, Grenchen, Switzerland

[21] Appl. No.: 359,740

[22] Filed: Dec. 20, 1994

[30] Foreign Application Priority Data

Dec. 28, 1993 [FR] France .................. 93 15752

[51] Int. Cl.$^6$ .................. H02K 1/12; H02K 1/27
[52] U.S. Cl. .................. 310/254; 310/49 R; 310/112; 310/185
[58] Field of Search .................. 310/254, 180, 310/185, 49 R, 112

[56] References Cited

U.S. PATENT DOCUMENTS

| | | | |
|---|---|---|---|
| 3,952,219 | 4/1976 | Mitsui et al. | 310/156 |
| 4,680,494 | 7/1987 | Grosjean | 310/156 |
| 5,130,594 | 7/1992 | Taghezout et al. | 310/254 |
| 5,289,071 | 2/1994 | Taghezout | 310/254 |
| 5,321,330 | 6/1994 | Taghezout | 310/257 |
| 5,396,139 | 3/1995 | Surmely et al. | 310/254 |

FOREIGN PATENT DOCUMENTS

| | | |
|---|---|---|
| 1613302 | 9/1970 | Germany. |
| 262080 | 9/1949 | Switzerland. |
| 549306 | 5/1974 | Switzerland. |
| 909260 | 10/1962 | United Kingdom. |

*Primary Examiner*—Steven L. Stephan
*Assistant Examiner*—Tran Nguyen
*Attorney, Agent, or Firm*—Griffin, Butler Whisenhunt & Kurtossy

[57] ABSTRACT

The present invention concerns an electromechanical transducer exhibiting a configuration of the cylindrical type and adapted in particular to serve as a stepping motor. In a three-phase embodiment, the transducer according to the invention comprises a stator (2) and a rotor (4) capable of turning around a rotation axis (6). The stator (2) comprises three pole pieces (8, 10, 12) each having a polar arm (14, 16, 18) oriented in the direction of the rotation axis of the rotor and bearing an energization winding (32, 34, 36).

15 Claims, 9 Drawing Sheets

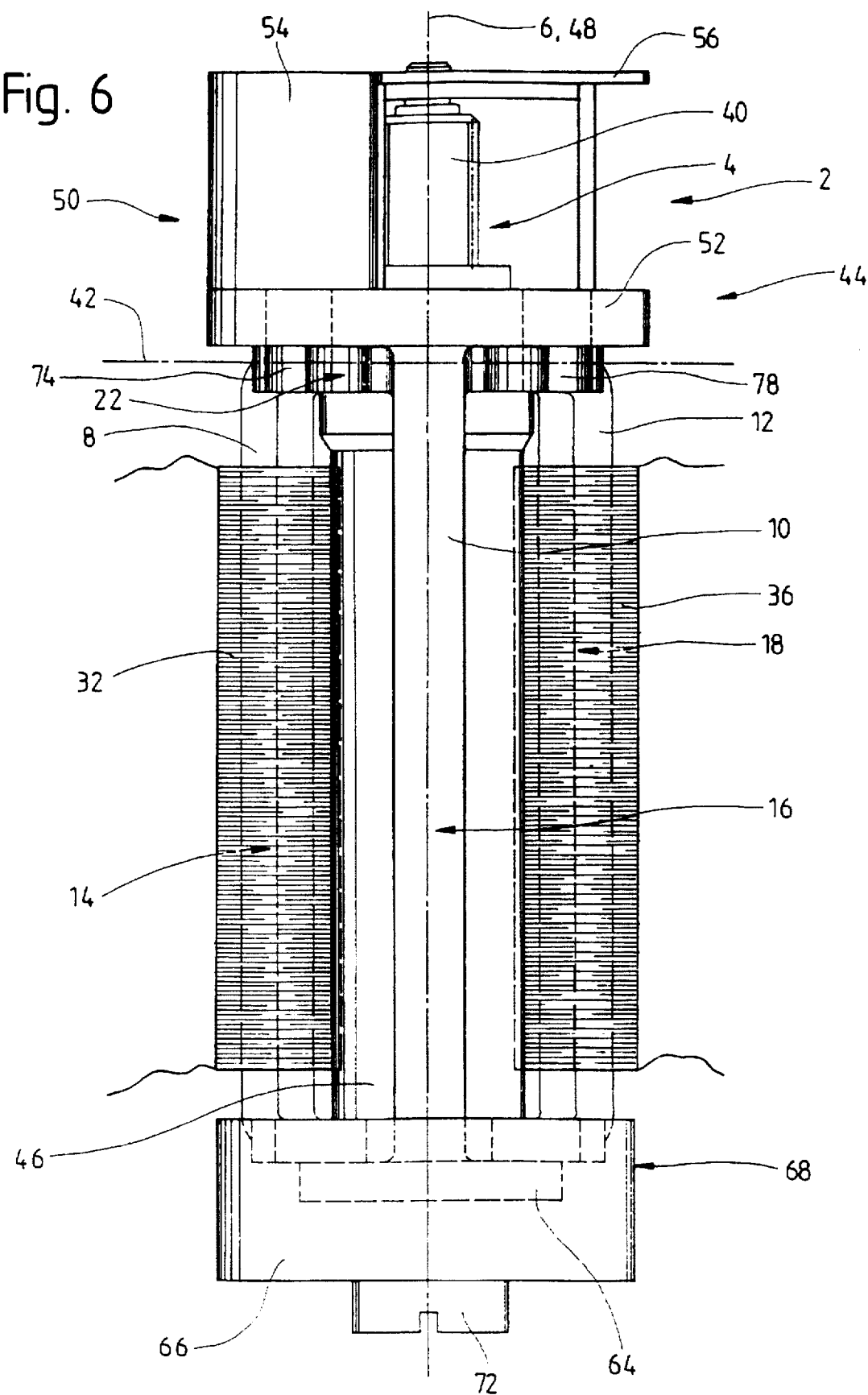

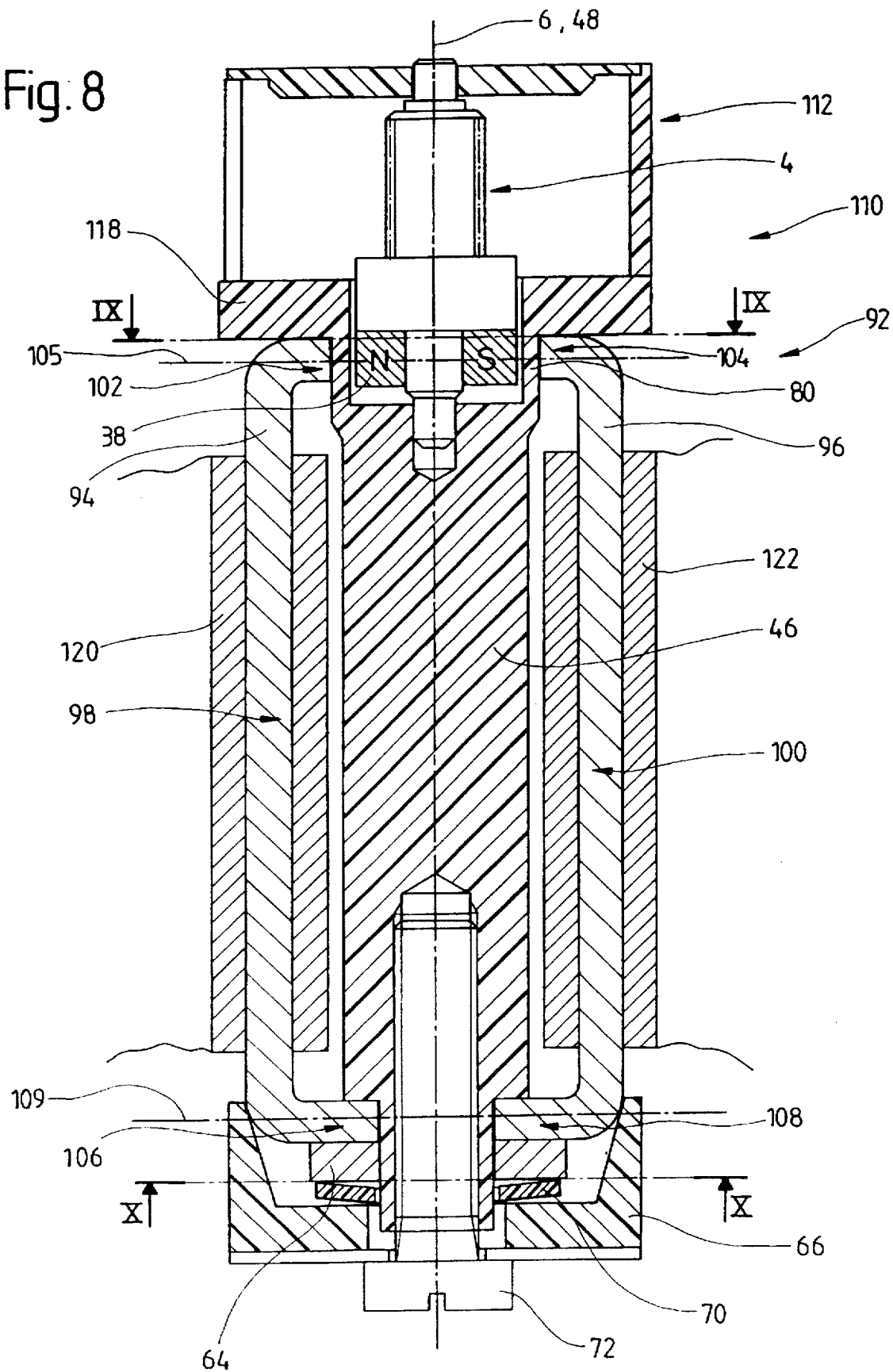

CYLINDRICAL ELECTROCHEMICAL TRANSDUCER

The present invention concerns electromechanical transducers exhibiting a configuration of the cylindrical type and being adapted in particular to serve as stepping motors. Specifically, the present invention concerns electromechanical transducers having a diameter on the order of some centimeters.

BACKGROUND OF THE INVENTION

Such electromechanical transducers of small dimensions and cylindrical configuration are utilised in various applications and in particular in telecommunication systems, in the audiovisual domain, in the medical domain, in robotics or again in security systems.

From patent document U.S. Pat. No. 3,952,219 there is known a motor of cylindrical configuration and including three longitudinal stator pieces defining an arc of a circle centered on the axis of rotation of the rotor. The three stator pieces are maintained between two flanges, each including a hole for the rotor shaft onto which is secured the permanent magnet. Three windings are mounted respectively on first portions of the three stator pieces. Other portions of such stator pieces are located facing the permanent magnet of the rotor. The stator pieces are radially positioned by the dog points provided at the ends of the stator pieces, such dog points being introduced into notches provided to this effect in the two flanges of the motor.

Such motor, although of relatively easy assembly, exhibits a certain number of problems. Initially, the rotor shaft traverses the motor longitudinally which is detrimental for the rotational stability of the rotor. Additionally, to bring about a mechanical coupling with an external arrangement, it is necessary to attach a gear onto the rotor shaft following assembly of the motor. Next, the form of the pole pieces generates a relatively substantial leakage flux and the permanent magnet of the rotor is not magnetically positioned according to the direction of the axis of rotation of such rotor. There is thus no axial magnetic positioning of the rotor. Thereafter, the two flanges serving to hold the stator pieces are not united with one another. From this fact, the structure of the motor is not stable, which spoils the yield of such motor.

There is also known from patent document DE 1 613 302 a motor comprising a rotor with a permanent magnet comprising a mounting formed from a central body, a flange located at one end of the central body and an external cylindrical portion rising up from the edge of the flange. This motor includes three stator pieces, each bearing an energization winding on a first portion and having a second portion located facing the permanent magnet of the rotor.

The motor further comprises a magnetic flux return disc secured to the central body with the help of a securing screw and a closing cover for the housing in which the permanent magnet is located. Such permanent magnet is mounted on a shaft, a first pivot of which is arranged in a bearing provided in the above-mentioned flange. Such shaft traverses the cover in order to permit the transmission of a force moment. The flange is located at the central body side relatively to the rotor permanent magnet. Three openings are provided in such flange, such openings being respectively traversed by the three stator pieces.

The portion forming the polar expansion of each of said stator pieces is further separated from the central axis of the rotor than the portion on which the winding is mounted. This configuration generates poor magnetic flux coupling of the winding with the magnetic flux of the permanent magnet. Once again, such motor exhibits poor axial centering of the rotor, the latter being drawn in the direction of the flange. In order to maintain the rotor in a predetermined axial position, an abutment is necessary at the end of the pivot engaged in the bearing provided in the flange, which increases the friction on the shaft of the rotor and consequently diminishes the yield of the motor.

It will be noted that the windings are provided on a first side of the flange while the polar expansions and the permanent magnet of the rotor are arranged on the other side of such flange. The stator pieces are radially positioned with the help of openings provided in the flange. However, such motor does not exhibit axial positioning means of the stator pieces. In a particularly disadvantageous manner, the windings are squeezed between the magnetic flux return disc and the flange. The securing of the magnetic flux return disc brings about a crushing of the windings and a longitudinal displacement of the stator pieces. Furthermore, the windings are brought in once the stator pieces are arranged in the openings provided in the flange. The construction of this motor is thus of small reliability and its assembly is complicated. Finally, it will be noted that in order to transmit a force couple, it is necessary to mount a gear on the rotor shaft once the cover is assembled on the stator pieces.

The purpose of the present invention is to overcome the drawbacks described hereinabefore in furnishing a reliable electromechanical transducer having a cylindrical configuration adapted for small motors and capable of being mass produced for a low manufacturing cost.

SUMMARY OF THE INVENTION

Consequently, the present invention has as object an electromechanical transducer comprising a stator and a rotor capable of turning around a rotation axis and including a permanent magnet, said stator comprising magnetic coupling means serving to couple magnetically at least a first winding to the permanent magnet, said magnetic coupling means comprising:

a first polar expansion and a second polar expansion each partially defining a stator hole traversed by said rotor, such first and second polar expansions being separated from one another by zones of high magnetic reluctance, a first polar arm and a second polar arm each having a first end and a second end, such first and second polar arms having their said first ends magnetically coupled respectively to said first polar expansion and to said second polar expansion and having their second ends magnetically coupled to one another, said first and second polar arms being oriented in a direction substantially parallel to said rotation axis, said first winding being borne by the first polar arm. The stator furthermore comprises a mounting including an elongated central body having a longitudinal central axis substantially merged with the rotation axis of the rotor and also including an end flange integral with the central body substantially perpendicular to the longitudinal central axis thereof. The transducer according to the invention is characterized in that the polar arms and the polar expansions are located below the upper surface of the flange relative to the central body, the polar expansions bearing axially against a surface of such flange.

Thanks to the characteristics of the invention mentioned hereinabove, the assembly of the electromechanical transducer is easy and the various pole portions can be solidly secured to the mounting so as to be positioned axially and radially.

According to a specific characteristic of the invention, the second ends of said polar arms are magnetically coupled to respective magnetic contact lugs belonging to the magnetic coupling means basically located in a plane perpendicular to the rotation axis of the rotor.

In a specific embodiment, the magnetic contact lugs are mechanically coupled among themselves by a ring of low magnetic reluctance belonging to the magnetic coupling means arranged to bear against such magnetic coupling lugs. Additionally, each of the polar arms forms, together with the respective polar expansion and the respective magnetic contact lug, one and the same pole piece.

According to three principal embodiments of the invention, there is respectively provided a three phase transducer, a two phase transducer and a single phase transducer.

Other characteristics and advantages of the invention will be described hereinafter with the help of the following description prepared with reference to the attached drawings given by way of non-limiting examples.

BRIEF DESCRIPTION OF THE DRAWINGS

FIG. 6 is a side view of a two phase electromechanical transducer according to the invention;

FIG. 8 is a longitudinal cross section of a single phase electromechanical transducer according to the invention;

DESCRIPTION OF THE PREFERRED EMBODIMENTS

Figure 1:
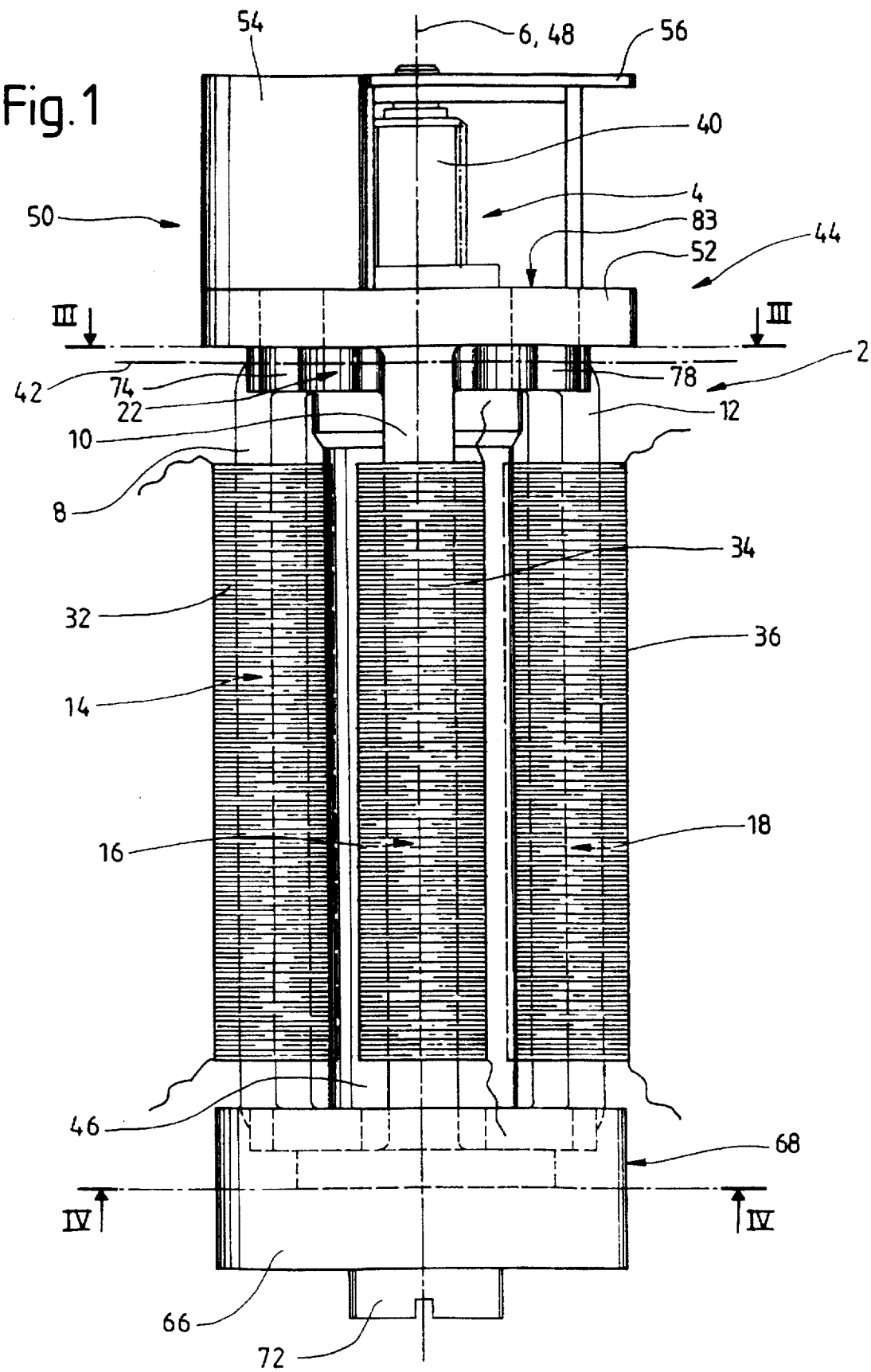
FIG. 1 is a side view of a three phase electromechanical transducer according to the invention.
Figure 2:
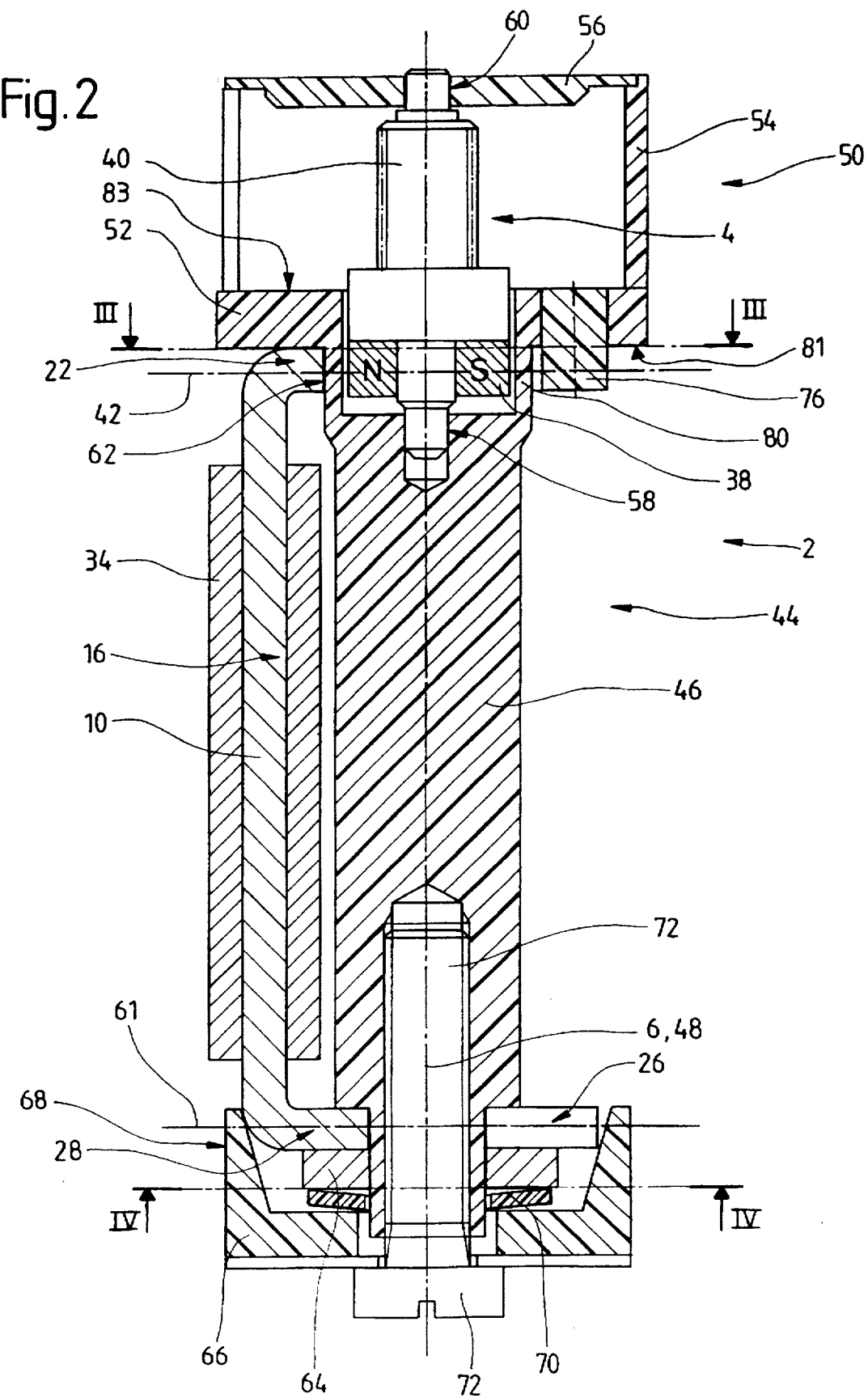
FIG. 2 is a longitudinal cross section of the electromechanical transducer shown on FIG. 1.
Figure 3:
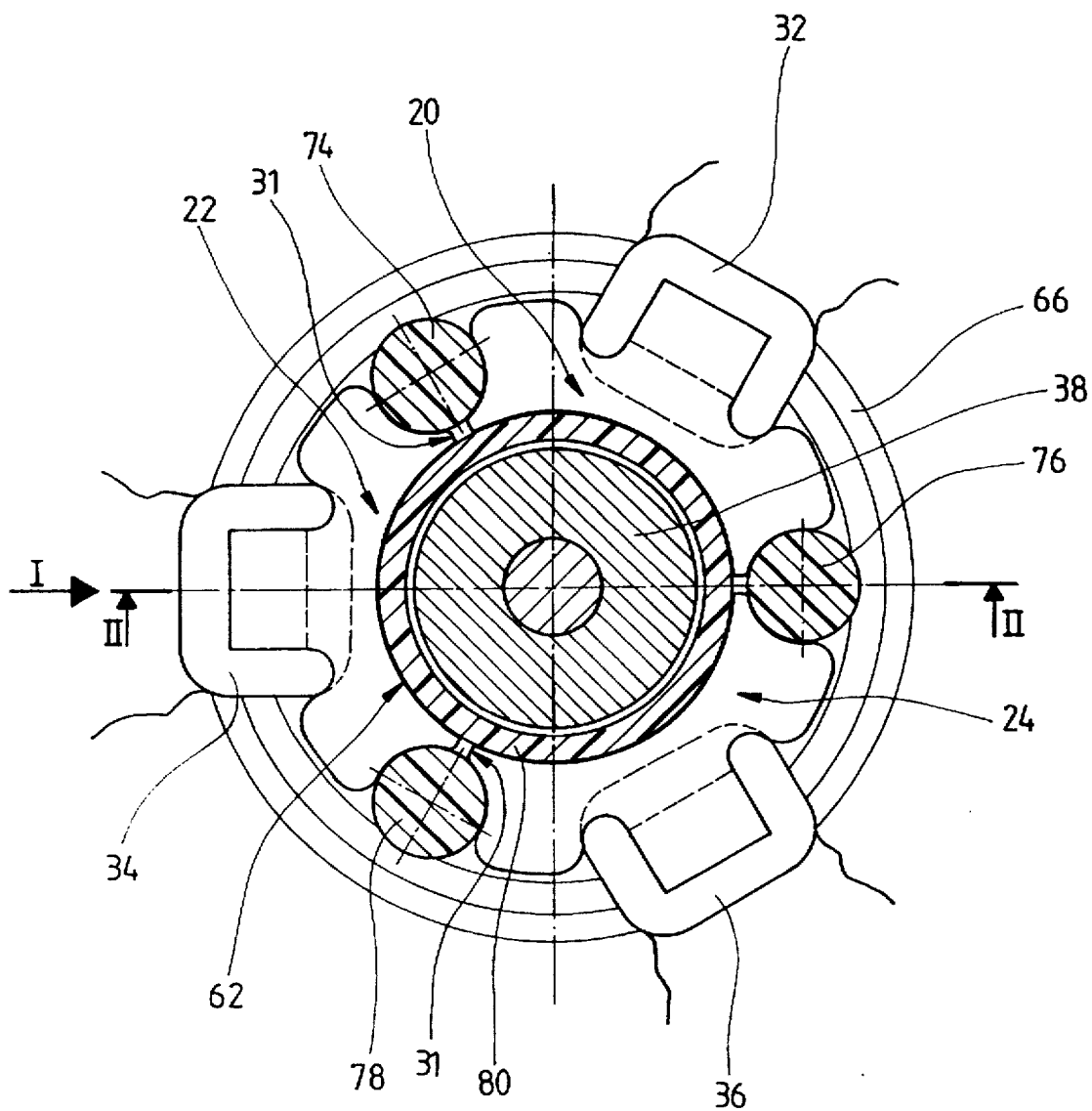
FIGS. 3 and 4 are cross sectional views of the electromechanical transducer shown on FIGS. 1 and 2 respectively according to the section lines III—III and IV—IV.
Figure 4:
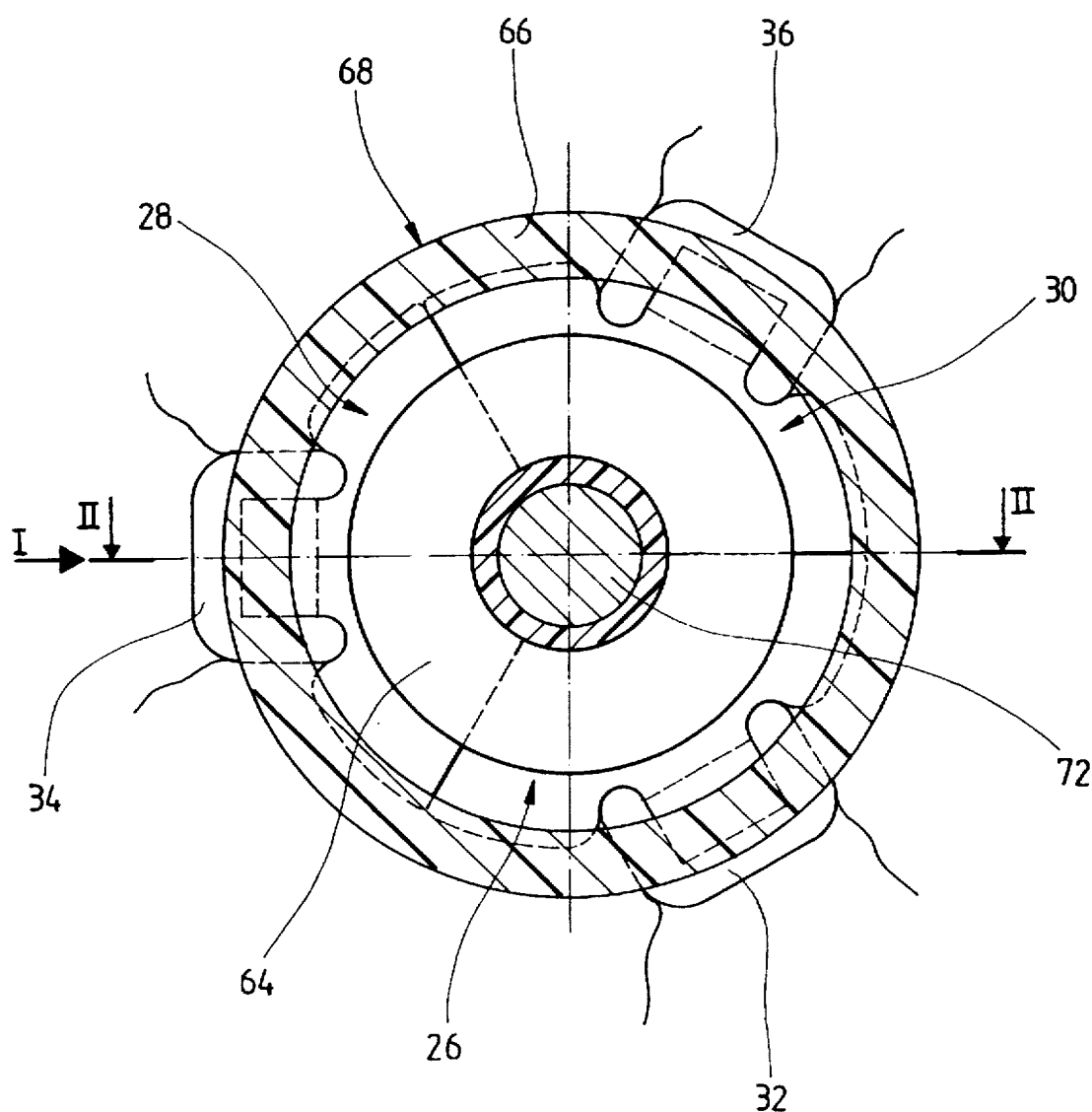

In referring hereinafter to FIGS. 1 to 5, there will be described a three phase electromechanical transducer according to the invention.

Such transducer comprises a stator 2 and a rotor 4 capable of turning around a rotation axis 6 determined relative to stator 2.

Stator 2 includes three pole pieces 8, 10 and 12. Each of the pole pieces 8, 10 and 12 comprises respectively a polar arm 14, 16 and 18, a polar expansion 20, 22 and 24 and a magnetic contact lug 26, 28 and 30. The polar expansions 20, 22 and 24 are separated from one another by gaps 31 forming high magnetic reluctance zones and are angularly shifted from one another through an angle of 120°.

The polar arms 14, 16 and 18 bear respectively energization windings 32, 34 and 36. Such polar arms 14, 16, and 18 are oriented in the direction of the rotation axis 6 of rotor 4.

Rotor 4 includes a bipolar permanent magnet 38 having radial magnetization and a gear 40 serving to couple mechanically such rotor 4 to a mechanical wheel (not shown) serving for the transmission of a force moment.

The three polar expansions 20, 22 and 24 extend in a common plane 42 perpendicular to the rotation axis 6.

The stator 2 also includes a non-magnetic mounting 44 comprising an elongated central body 46 having a central longitudinal axis 48 merged with the rotation axis 6 of rotor 4. Mounting 44 further comprises a cage 50 formed by a flange 52, a lateral wall 54 and a cover 56. Flange 52 and wall 54 are formed together with the elongated central body 46 in a single piece.

Rotor 4 is maintained in position in the direction of the rotation axis 6 by means of a first bearing 58 arranged in the central elongated body 46 and a second bearing 60 provided in cover 56. In this embodiment, the permanent magnet 38 is located in the stator opening 62 defined by the polar expansions 20, 22 and 24.

The magnetic contact lugs 26, 28 and 30 are located in a plane 61 perpendicular to the rotation axis 6 and are magnetically coupled among themselves by means of a ring 64 of low magnetic reluctance. Here it will be noted that the three magnetic contact lugs are arranged in a manner such that ring 64 is not indispensable in order to assure magnetic coupling among the pole pieces 8, 10 and 12. Nevertheless, its presence enables reinforcing the magnetic coupling and enables increasing the machining tolerances of the pole pieces 8, 10 and 12.

Ring 64 and pole pieces 8, 10 and 12 are fixedly assembled to mounting 44 of the stator by means of a base 66 exhibiting an annular projection 68. Additionally, there is provided an elastic ring 70 serving to maintain the ring 64 bearing against the magnetic contact lugs 26, 28 and 30.

Base 66 is secured to the elongated central body 46 of mounting 44 by means of a securing screw 72. Additionally, the pole pieces 8, 10 and 12 are maintained fixed to the mounting 44 and positioned relative to one another by means of pins 74, 76 and 78 projecting from the flange 52. Such pins 74, 76 and 78 are housed in notches provided to this effect in the polar expansions 20, 22 and 24. The maintenance in fixed position of the polar expansions 20, 22 and 24 is assured conjointly by pins 76 and 78 and by an annular portion 80 provided in the stator hole 62, such annular portion 80 belonging to the mounting 44 and forming an intermediate portion between the elongated central body 46 and flange 52.

It will be noted that according to an advantageous characteristic of the invention, plane 42 in which extend the three polar expansions 20, 22 and 24 is located below the upper surface 83 of flange 52 relative to the central body 46. The flange 52 serves as abutment for the pole pieces 8, 10 and 12, the polar expansions 20, 22 and bearing against the surface 81 of flange 52. It is also possible to provide other variants in which the flange exhibits blind cavities in which the polar expansions are at least partially housed. Such blind cavities can be arranged in order to position the polar expansions in a manner such that the pins 74, 76 and 78 can then be eliminated.

The annular portion 80 serves to couple materially the central body 46 to the flange 52 and at the same time to center the polar expansions 20, 22 and 24. Although such annular portion 80 increases slightly the gap between the polar expansions, it plays an important role in the construction of the transducer according to the invention.

The pole pieces can be applied laterally during the assembly, then brought to bear against flange 52. Thereafter, base 66 is applied against the pole pieces and an axial force is exerted on such pole pieces by means of screw 72 which is screwed into mounting 44. Thus, the pole pieces 8, 10 and 12 are maintained by an axial pressure between the flange 52 belonging to mounting 44 and base 66 solidly secured to the mounting by an appropriate securing means.

The electromechanical transducer described hereinbefore exhibits by way of example a diameter of about 7 mm. and a length along the rotation axis 6 of about 20 mm. Such transducer is arranged in a compact manner and is formed entirely from parts of little cost, easily obtainable in an industrial manner. Additionally, the assembling of the pole pieces 8, 10 and 12 and of the rotor 4 with mounting 44 presents no technical difficulty. In particular, the positioning of the pole pieces 8, 10 and 12 is easily brought about. It will be further noted that the assembly of windings 32, 34 and 36 is also easily brought about, such windings being respectively mounted on the polar arms 14, 16 and 18 before assembly of the pole pieces 8, 10 and 12 with the mounting 44 of stator 2.

According to an embodiment not shown, the permanent magnet of the rotor is a multipolar magnet adapted to be located within the stator opening or in a plane neighbouring the plane 42 in which extend the polar expansions 20, 22 and 24. In particular, the multipolar magnet can be located below the plane 42 from the side of the elongated central body. In the case of axial magnetization, a magnetic plate for the return of the magnetic flux can be assembled, if necessary, with the multipolar magnet or be placed in the bottom of the housing arranged in the mounting 44 for rotor 4. It will be further noted that the profile of the polar expansions defining the stator hole can take any form whatsoever and, for example, define a circular crown.

Figure 5:
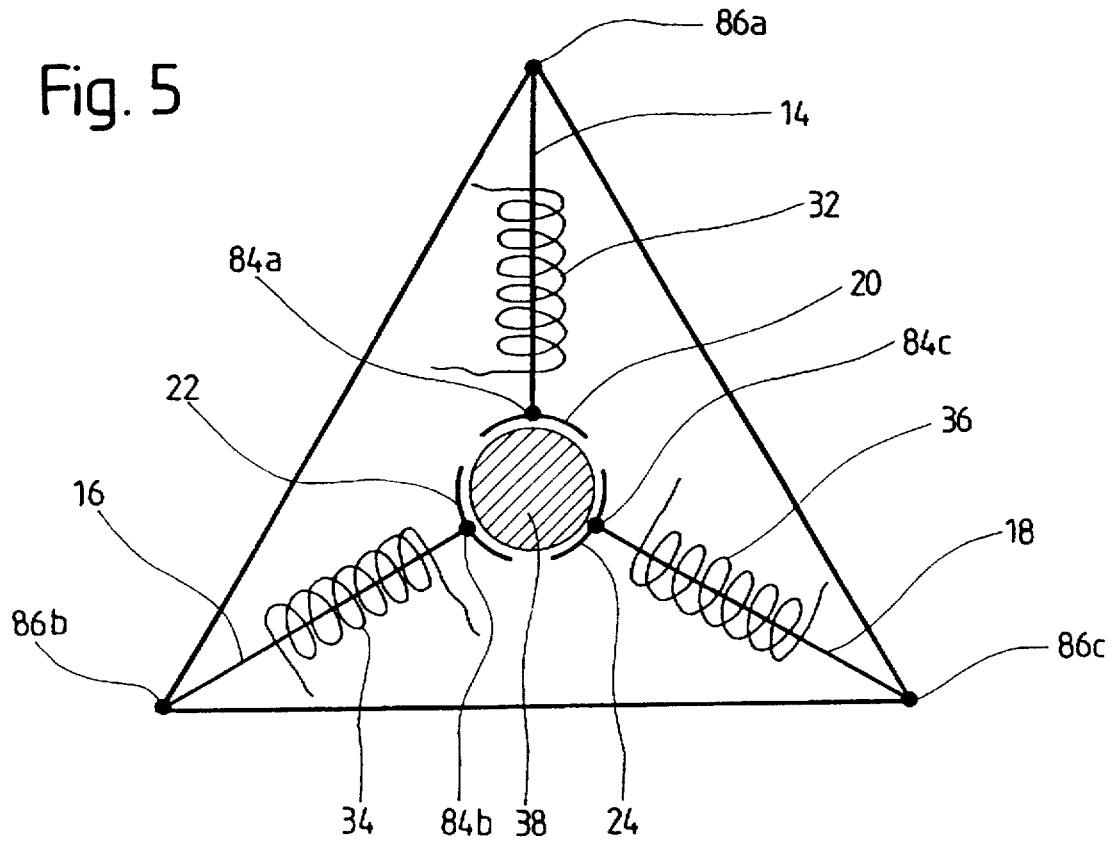
FIG. 5 shows the magnetic schematic of the electromechanical transducer shown on FIGS. 1 to 4.

On FIG. 5 has been shown a magnetic schematic of the electromechanical transducer described hereinbefore with the help of FIGS. 1 to 4. On such FIG. 5 have been shown schematically the permanent magnet 38 of rotor 4, the three polar expansions 20, 22 and 24, the three polar arms 14, 16 and 18 and the three windings 32, 34 and 36.

Each of the polar arms 14, 16 and 18 is magnetically coupled respectively by a first end 84a, 84b and 84c to the respective polar expansion 20, 22 and 24. Each of the three polar arms 14, 16 and 18 has its respective second end 86a, 86b and 86c coupled to the second ends of the other two polar arms as has been schematically shown on this FIG. 5.

In the embodiment described hereinbefore, the magnetic coupling between the second ends 86a, 86b and 86c is advantageously provided by the three magnetic contact lugs 26, 28, 30 associated with the ring 64 of low magnetic reluctance.

Electrical energization of the three windings 32, 34 and 36 is brought about in a known manner by any control appropriate to this type of transducer as known to the person skilled in the art. Energization of an electromechanical transducer showing a magnetic schematic equivalent to that shown on FIG. 5 is known to the person skilled in the art of transducers of small dimensions, in particular of the horological type. Thus the electrical energization of the electromechanical transducer according to the invention described hereinbefore, will not be described in detail in the present document.

It will however be noted that the transducer described hereinbefore can be utilised in a synchronous operating mode or in a stepping mode in accordance with the type of energization selected. In the case of a stepping mode operation, it is possible to provide positioning notches in the polar expansions 20, 22 and 24.

On FIG. 6 is shown a two phase electromechanical transducer according to the invention.

Such two phase electromechanical transducer is distinguished from the three phase electromechanical transducer described hereinbefore solely by the fact that it includes only two energization windings 32 and 36 and that consequently one of the polar arms 16 bears no winding. Given that this embodiment of an electromechanical transducer according to the invention is identical in construction to the three phase electromechanical transducer described with the help of FIGS. 1 to 4, the references on FIG. 6 will not again be described here in detail.

Figure 7:
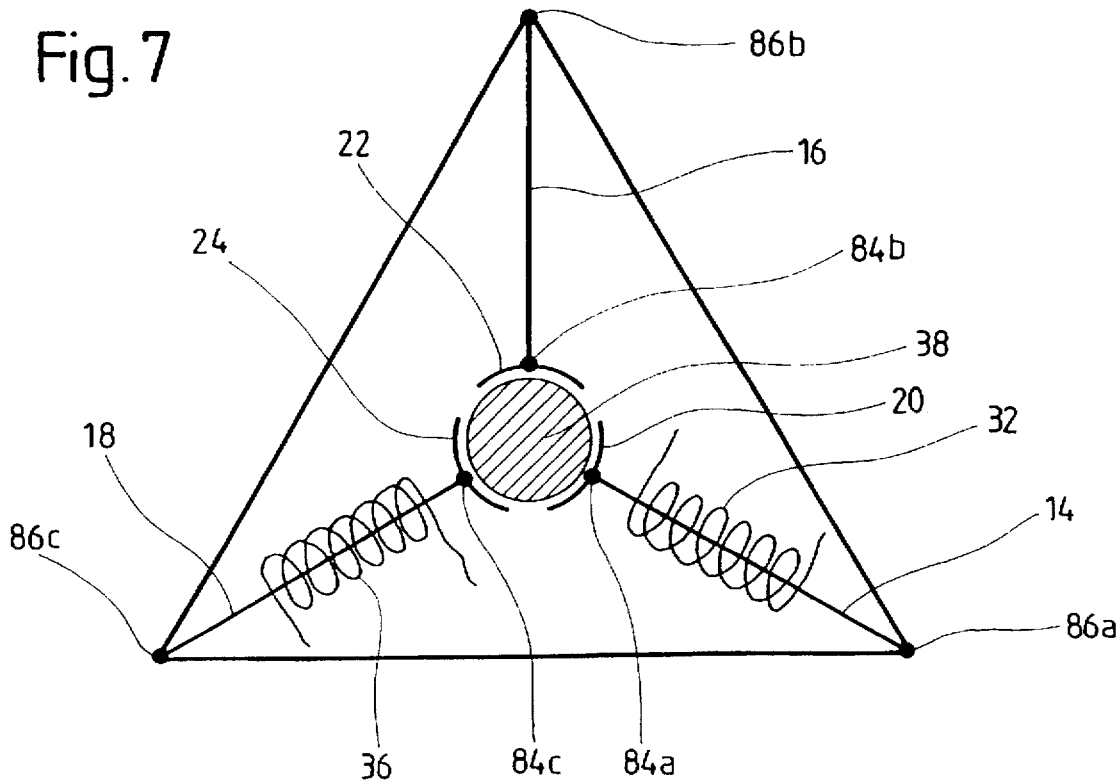
FIG. 7 shows the magnetic schematic of the electromechanical transducer shown on FIG. 6.

On FIG. 7 is shown the magnetic schematic of the two phase electromechanical transducer shown on FIG. 6. As has just been mentioned, the sole difference from the magnetic schematic of the three phase electromechanical transducer described hereinbefore with the aid of FIG. 5 resides in the fact that such electromechanical transducer is provided solely with two windings 32 and 36. Different types of energization of the two phase transducer having a magnetic schematic corresponding to that shown on FIG. 7 are known to persons skilled in the art, in particular persons skilled in the art of transducers of a horological type. The references mentioned on FIG. 7 and already described previously will not again be described here.

The two phase electromechanical transducer shown on FIG. 6 can be energized in a synchronous mode or in a stepping mode. In this latter case, positioning notches in the polar expansions 20, 22 and/or 24 are advantageously provided, the arrangement of such positioning notches being known to persons skilled in the art.

Figure 9:
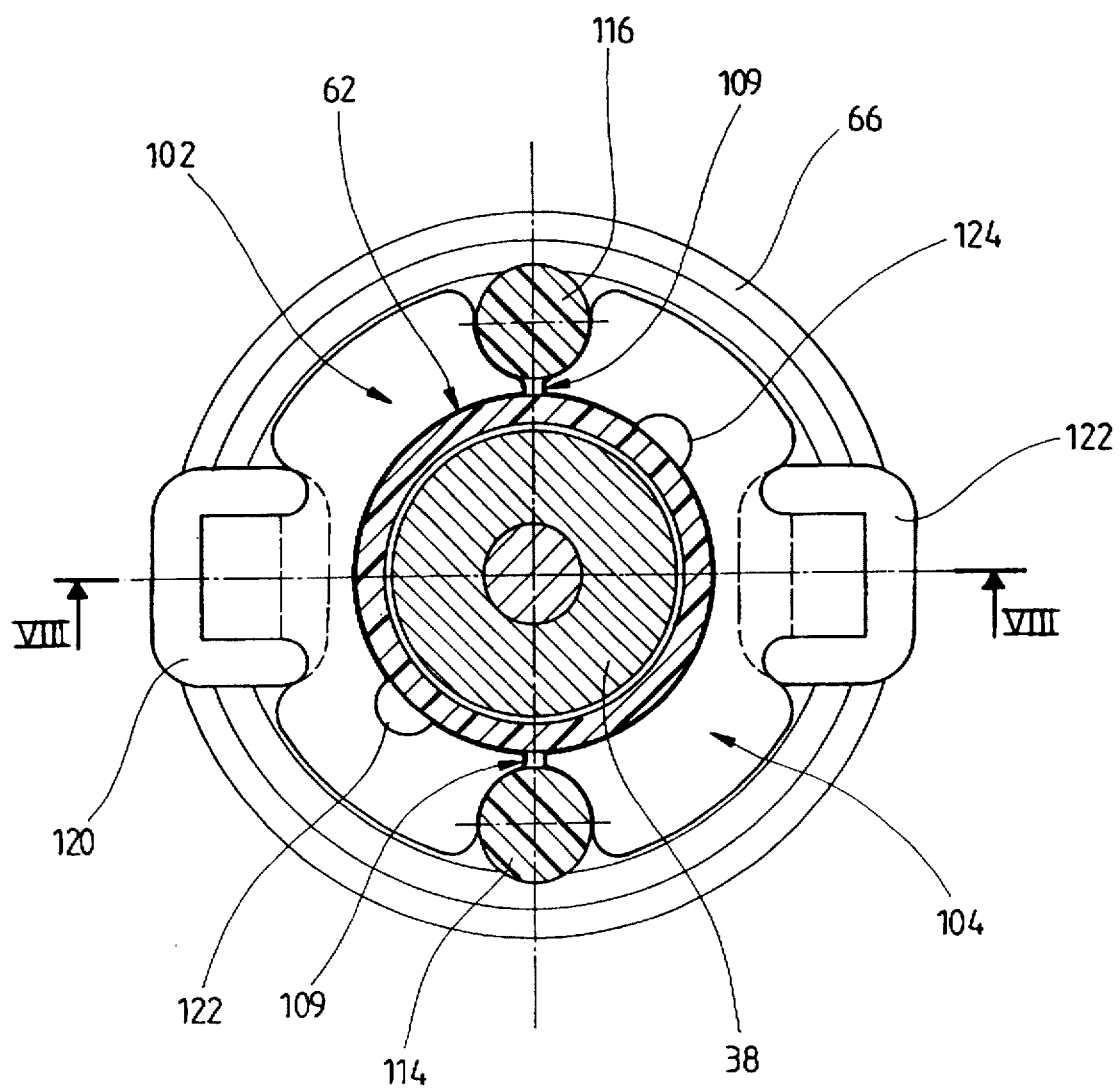
FIGS. 9 and 10 are cross section views of the electromechanical transducer shown on FIG. 8 respectively according to the section lines IX—IX and X—X.
Figure 10:
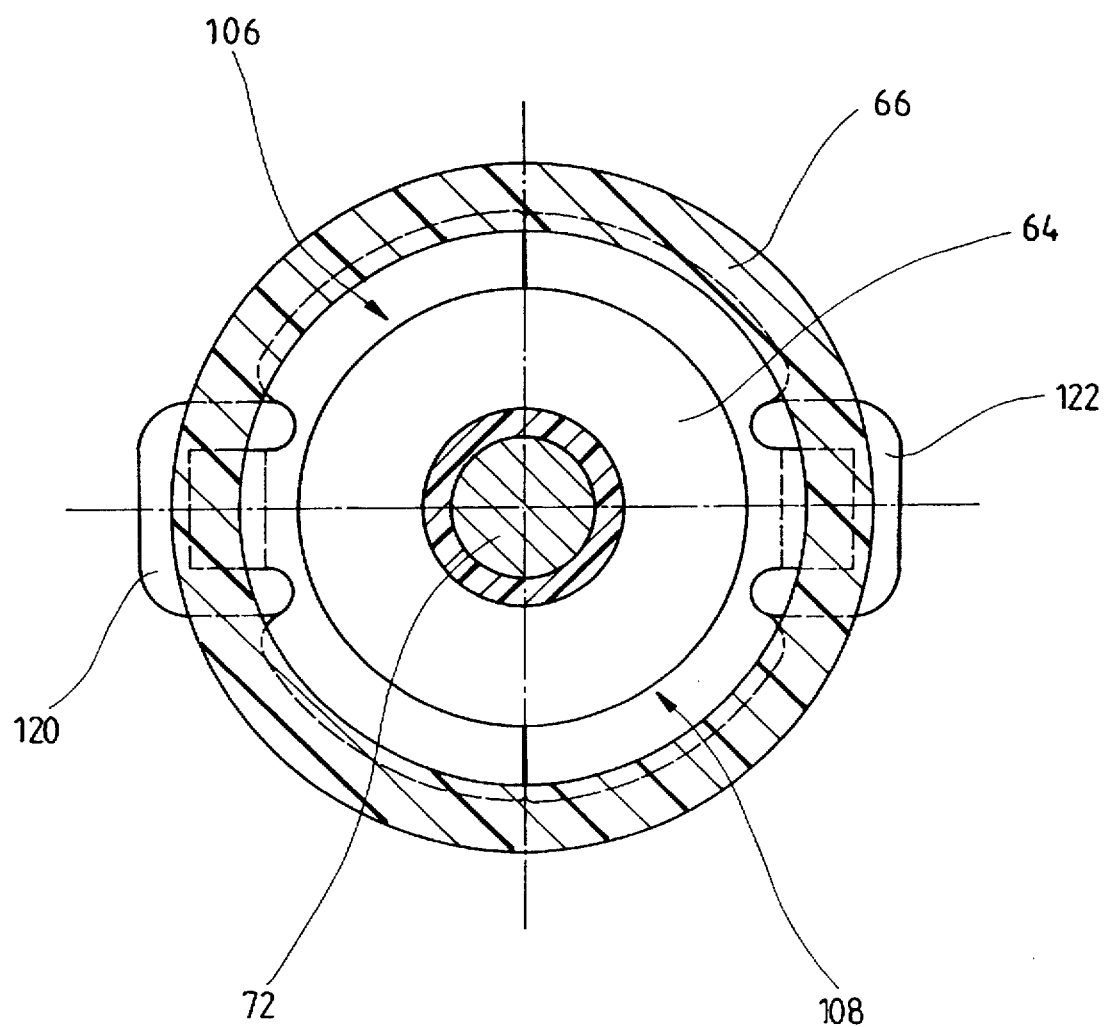

Referring hereinafter to FIGS. 8 to 10, there will be described a single phase electromechanical transducer according to the invention.

Such single phase transducer comprises a rotor 4 capable of turning around a rotation axis 6 and a stator 92 comprising a first pole piece 94 and a second pole piece 96. Each of such pole pieces 94 and 96 is formed respectively by a polar arm 98, 100, a polar expansion 102, 104 extending in a plane 105 perpendicular to the rotation axis 6 of rotor 4 and a magnetic contact lug 106, 108.

The polar expansions 102 and 104 are separated from one another by two gaps 109 forming two zones of high magnetic reluctance.

The two magnetic contact lugs 106 and 108 are magnetically coupled together with the help of a ring 64 of low magnetic reluctance.

Stator 92 furthermore includes a mounting 110 comprising a cage 112 equivalent to cage 50 for the two phase and three phase embodiments described hereinbefore. Additionally, mounting 110 comprising an elongated central body 46, a base 66 and a securing screw 72 serving to secure such base 66 to the central body 46 identical to the two phase and three phase embodiments described hereinbefore.

The low magnetic reluctance ring 64 is again applied against the magnetic contact lugs 106 and 108 with the help of an elastic ring 70 forming a spring. The pole pieces 94 and 96, in particular the polar expansions 102 and 104, are positioned and maintained in position with the help of two pins 114 and 116 housed in notches provided to such effect in the polar expansions 102 and 104, such pins 114 and 116 projecting from flange 118 of cage 112 in a manner equivalent to the embodiments previously described. Flange 118 is materially coupled to the central body 46 by a ring 80 provided between the magnet 38 of rotor 4 and the polar expansions 102 and 104.

Each of the two polar arms 98 and 100 bears a respective winding 120, 122. Such polar arms 98 and 100 exhibit an orientation parallel to the rotation axis 6 of rotor 4, which is merged with the central axis 48 of the elongated central body 46.

The electrical energization of windings 120 and 122 can be effected in a known manner, either in series or in parallel.

Here it will be noted that it is also possible to provide a variant (not shown) for this embodiment with a single winding borne by one of the two polar arms 98 or 100. However, the variant shown on FIG. 8 with two windings 120 and 122 is more advantageous as far as concerns the space taken up by the transducer, given that for a same flux generated in the pole pieces 94 and 96 with a given electrical energization, the two windings 120 and 122 each exhibit a dimension less than the resulting dimension for a single winding borne by one of the two polar arms 98 or 100. On the other hand, manufacture with a single winding is less burdensome.

The single phase electromechanical transducer described here is particularly adapted to a stepping mode of operation. In a known manner, two positioning notches 122 and 124 are provided in the polar expansions 102 and 104 and serve to position the permanent bipolar magnet 38 of rotor 4 in two rest positions which are advantageous for operation of such single phase transducer.

What I claim is:

1. An electromechanical transducer comprising a stator and a rotor capable of turning around a rotation axis and including a permanent magnet, said stator comprising magnetic coupling means serving to couple magnetically at least a first winding to said permanent magnet, said magnetic coupling means comprising:
   a first polar expansion and a second polar expansion each partially defining a stator hole traversed by said rotor, such first and second polar expansions being separated from one another by zones of high magnetic reluctance,
   a first polar arm and a second polar arm each having a first end and a second end, such first and second polar arms having their said first ends respectively coupled magnetically to said first polar expansion and to said second polar expansion and having their second ends magnetically coupled to one another, said first and second polar arms being oriented in a direction substantially parallel to said rotation axis, said first winding being borne by said first polar arm, said stator furthermore comprising a mounting including an elongated central body having a longitudinal central axis substantially merged with said rotation axis of said rotor and also including an end flange integral with said central body and substantially perpendicular to said longitudinal central axis, said polar arms and said polar expansions being located below the upper surface of said flange relative to said central body, said polar expansions bearing axially against a surface of such flange.

2. A transducer as set forth in claim 1, said stator further including a second winding borne by said second polar arm.

3. A transducer as set forth in claim 2, said magnetic coupling means further including a third polar expansion partially defining said stator hole and a third polar arm having a first end magnetically coupled to said third polar expansion and a second end magnetically coupled to said second ends of said first and second polar arms, said third polar arm being oriented in a direction substantially parallel to said rotation axis of said rotor.

4. A transducer as set forth in claim 3, said stator including a third winding borne by said third polar arm and magnetically coupled to said permanent magnet by said magnetic coupling means.

5. A transducer as set forth in claim 3, wherein said first and second polar expansions extend basically in a first common plane perpendicular to said rotation axis.

6. A transducer as set forth in claim 5, wherein said third polar expansion extends basically in said first plane.

7. A transducer as set forth in claim 1, wherein said permanent magnet exhibits radial magnetization, such magnet being located at least partially in the interior of said stator hole, said central body having an annular portion defining a cavity at a first end, said magnet being at least partially housed in the interior of such cavity, said annular portion forming an intermediate material coupling portion between said central body and said flange, said polar expansions being at least partially arranged against the external face of said annular portion.

8. A transducer as set forth in claim 7, further comprising a base fixed to a second end of said central body by first securing means, such base exerting a pressure on said second ends of said polar arms so as to support axially such polar arms and said polar expansions.

9. A transducer as set forth in claim 8, wherein said polar arms and said polar expansions are radially maintained in place by second securing means associated with said flange.

10. A transducer as set forth in claim 1, wherein said second ends of said polar arms are magnetically coupled to respective magnetic contact lugs belonging to said magnetic coupling means and basically located in a second plane perpendicular to said rotation axis of said rotor, said magnetic contact lugs being magnetically coupled among themselves by a ring of low magnetic reluctance belonging to said magnetic coupling means and arranged to bear against such magnetic contact lugs.

11. A transducer as set forth in claim 10, wherein each of said polar arms together with said respective polar expansions and said respective magnetic contact lugs forms a single common pole piece.

12. A transducer as set forth in claim 3, wherein said second ends of said polar arms are magnetically coupled to respective magnetic contact lugs belonging to said magnetic coupling means and basically located in a second plane perpendicular to said rotation axis of said rotor, said magnetic contact lugs being magnetically coupled among themselves by a ring of low magnetic reluctance belonging to said magnetic coupling means and arranged to bear against such magnetic contact lugs.

13. A transducer as set forth in claim 12, wherein each of said polar arms together with said respective polar expansions and said respective magnetic contact lugs forms a single common pole piece.

14. An electromechanical transducer comprising a stator and a rotor capable of turning around a rotation axis and including a permanent magnet, said stator comprising magnetic coupling means serving to couple magnetically at least a first winding to said permanent magnet, said magnetic coupling means comprising:
   a first polar expansion and a second polar expansion each partially defining a stator hole traversed by said rotor, said first polar expansion and said second polar expansion being separated from one another by zones of high magnetic reluctance,
   a first polar arm and a second polar arm each having a first end and a second end, said first and second polar arms having their first ends respectively coupled magnetically to said first polar expansion and to said second polar expansion and having their second ends magnetically coupled to one another, said first polar arm and said second polar arm being oriented in a direction substantially parallel to said rotation axis, said first winding being borne by said first polar arm, said stator further comprising a mounting including an elongated central body having a longitudinal central axis substantially merged with said rotation axis of said rotor and also including a non-magnetic end flange integral with said central body and substantially perpendicular to said longitudinal central axis, said polar arms and said polar expansions being located below the upper surface of said flange relative to said central body, said polar expansions bearing axially against a surface of said flange.

15. An electromechanical transducer comprising a stator and a rotor capable of turning around a rotation axis and including a permanent magnet, said stator comprising magnetic coupling means serving to couple magnetically at least a first winding to said permanent magnet, said magnetic coupling means comprising:

a first polar expansion and a second polar expansion each partially defining a stator hole traversed by said rotor, said first polar expansion and said second polar expansion being separated from one another by zones of high magnetic reluctance, a first polar arm and a second polar arm each having a first end and a second end, Said first and second polar arms having their first ends respectively coupled magnetically to said first polar expansion and to said second polar expansion and having their second ends magnetically coupled to one another, said first polar arm and said second polar arm being oriented in a direction substantially parallel to said rotation axis, said first winding being borne by said first polar arm, said stator further comprising a mounting including an elongated integral central body having a longitudinal central axis substantially merged with said rotation axis of said rotor, said central body having an annular portion at one end thereof surrounding a region in which said magnet rotates and an end flange having an upper surface and a lower surface extending around said annular portion substantially perpendicular to said longitudinal central axis and above a common plane in which said polar expansions lie, said polar arms and said polar expansions being located below said upper surface of said flange, said polar expansions bearing axially against said lower surface of said flange.

\* \* \* \* \*